United States Patent
Weindorf

(10) Patent No.: US 9,743,492 B2
(45) Date of Patent: Aug. 22, 2017

(54) SYSTEM AND METHOD FOR LUMINANCE DEGRADATION REDUCTION USING CONSUMPTION RATE LIMITS

(71) Applicant: Paul Fredrick Luther Weindorf, Novi, MI (US)

(72) Inventor: Paul Fredrick Luther Weindorf, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/954,296

(22) Filed: Nov. 30, 2015

(65) Prior Publication Data

US 2017/0156191 A1    Jun. 1, 2017

(51) Int. Cl.
    *H05B 37/02*      (2006.01)
    *H05B 33/08*      (2006.01)

(52) U.S. Cl.
    CPC ..... *H05B 37/0227* (2013.01); *H05B 33/0896* (2013.01)

(58) Field of Classification Search
    CPC H05B 33/08; H05B 33/0848; H05B 33/0854; G09G 3/30; G09G 3/32; G09G 5/00

USPC .......... 315/169.1–169.3, 291, 307, 308–312
See application file for complete search history.

(56) References Cited

U.S. PATENT DOCUMENTS

| 8,902,132 | B2 * | 12/2014 | Ozawa | G09G 3/3233 |
| | | | | 315/169.3 |
| 8,994,276 | B2 * | 3/2015 | Recker | H02J 9/02 |
| | | | | 315/160 |

FOREIGN PATENT DOCUMENTS

EP      1 505 565 A1    9/2005

* cited by examiner

*Primary Examiner* — Jimmy Vu
(74) *Attorney, Agent, or Firm* — Dickinson Wright PLLC

(57) ABSTRACT

A system to compensate for luminance degradation of an emissive display is provided. The system employs a combination of a consumption rate limit and temperature to regulate and control display luminance for emissive displays (such as organic light emitting diodes). A consumption rate limit is employed to determine a display luminance ceiling at which to drive the display. By employing the aspects disclosed herein, the display systems may achieve a longer lifetime.

15 Claims, 4 Drawing Sheets

SYSTEM AND METHOD FOR LUMINANCE DEGRADATION REDUCTION USING CONSUMPTION RATE LIMITS

BACKGROUND

Organic light emitting diode (OLED) displays are becoming more commonplace for their numerous advantages. However, emissive display technologies, such as OLED displays, suffer from differential aging (or luminance degradation), and must be carefully analyzed and used to ensure that lifetime expectations are met. Differential aging is where portions or colors of the display used more frequently emit a lower luminance than portions used less frequently. Light valve technology such as liquid crystal, interferometric modulator, LCOS, micro-minor, and electrophoretic displays do not suffer from differential aging because they depend on a general light source that decays independent of localized screen use. Since emissive technology displays suffer from differential aging, screen saver functions are required if the same data is displayed over long periods of time. Although OLED displays have many benefits, their major disadvantage is aging. In addition, aging of OLED displays is accelerated substantially at elevated temperatures, commonly associated with automotive environments.

For example, an implementer of a display may configure or request OLEDs to be driven at levels greater than 600 cd/m$^2$ in order to maintain display visibility, the amount of permanent luminance consumption (or amount that the luminance decreases) increases dramatically as the OLED operating temperature is increased. The amount of compensation that may be applied at the pixel level to minimize burned-in image effects is limited which necessitates the use other methods to minimize the OLED consumption rate under infrequent adverse conditions.

Another technique has been proposed, thermal derating, to address the problems associated with differential aging. A thermal derating method allows for control of an overall temperature associated with a display technologies operation, in order to maximize the lifetime of an OLED.

However, each of the above proposed methods may not be robust enough to handle the issues associated with luminance degradation.

SUMMARY

A system to compensate for luminance degradation of a display is described herein. The system includes a luminance control system coupled to the display and configured to provide power to the display thereby controlling the display luminance, the luminance control system including an input to receive a consumption rate (CR) limit; a temperature sensor proximate the display and in electrical communication with the controller, wherein the luminance control system is configured to vary the display luminance, based on a temperature measured by the temperature sensor and the CR limit.

In another example of the system, the display luminance is determined by a relationship between the consumption rate, maximum luminance of the display, and temperature of the display.

In another example of the system, the display luminance is maximized so as to be under CR limit by employing the following relationship:

$$L_{OP} = f(CR, K^{\circ}).$$

In another example of the system, the temperature sensor is a thermistor.

In another example of the system, the luminance control system retrieves a luminance based on correlating the measured temperature with a value in a predefined lookup table.

In another example of the system, the luminance control system is implemented with a circuit to perform the relationship.

In another example of the system, the luminance control system employs a PID control loop.

Also provided is a display integrated with a luminance control system. The display includes a consumption rate (CR) limit; a temperature sensor proximate the display and in electrical communication with the controller, wherein the luminance control system coupled to the display and configured to provide power to the display thereby controlling the display luminance, and the luminance control system is configured to vary the display luminance, based on a temperature measured by the temperature sensor and the CR limit.

Further objects, features and advantages of this invention will become readily apparent to persons skilled in the art after a review of the following description, with reference to the drawings and claims that are appended to and form a part of this specification.

DETAILED DESCRIPTION

Figure 1:
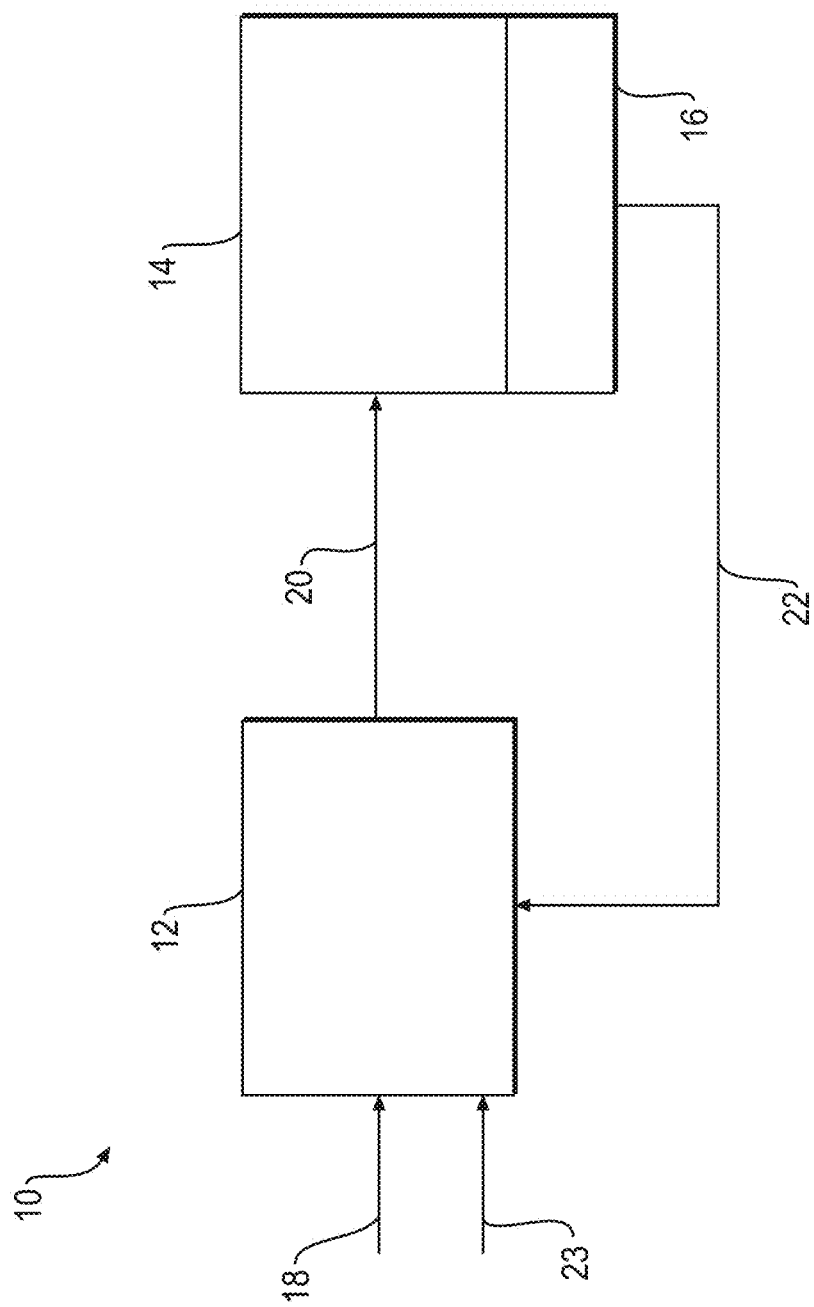
FIG. 1 is a block diagram of a system to compensate for luminance degradation according to the aspects disclosed herein.

Referring now to FIG. 1, a system embodying the principles of the present invention is illustrated therein and designated at 10. As its primary components, the system 10 includes a control circuit 12 (luminance control system), an emissive display 14, and a temperature sensor 16 (for example, via a thermistor). A desired luminance signal 18 is provided to the control circuit 12, the desired luminance signal 18 is often generated from a display brightness control (not shown).

The control circuit 12 generates a display drive signal 20 based on the desired luminance signal 18. The display drive signal 20 is provided to the emissive display 14, causing the emissive display 14 to operate at a specific display luminance level. The temperature sensor 16 is located proximate the emissive display 14 and configured to monitor a temperature of the emissive display 14. The temperature sensor 16 generates a feedback signal 22 which is received by the control circuit 12. The feedback signal 22 is based on a calculated luminance. The calculated luminance, otherwise known as $L_{op}$, will be explained later, and is partially derived by the known temperature measured by the temperature sensor 16 and the CR limit 23.

Also shown in a CR Limit 23. The CR limit 23 is set by a user via the relationships discussed in the experimentally derived formulas/graphs disclosed herein. The CR limit 23 may be manually set, set by a lookup table, set by an electronic circuit employed to calculate a relationship based on the temperature, and the like.

The control circuit 12 includes logical circuits configured to receive the measured temperature, apply the measured temperature to the derived relationship for establishing a CR limit 23, and communicate a $L_{op}$ to the emissive display 14 (via the feedback signal 22, which causes the display drive signal 20 to modify the emissive display 14).

In one such example, experimental testing may be employed to determine a relationship to determine a consumption rate for a specific OLED. As shown below, in one example of testing a sample OLED emissive display 14, the following value for determining a consumption rate (CR) is obtained (nits is a measure of luminance):

$$CR = \frac{L_{op}^2}{L_{max}} \frac{0.1}{(6.42 \times 10^{10}) \times {}^\circ K^{-3} - 1075.5} \frac{\text{nits}}{\text{hour}} \qquad \text{FORMULA 1}$$

wherein:

$L_{op}$ is Operating Luminance of emissive display 14;

$L_{max}$=Maximum Display Luminance for emissive display 14; and

° K=Temperature in Kelvin as measured by the temperature sensor 16

FORMULA 1 may be used to calculate the CR limit when the luminance is known as well as the temperature.

Figure 2:
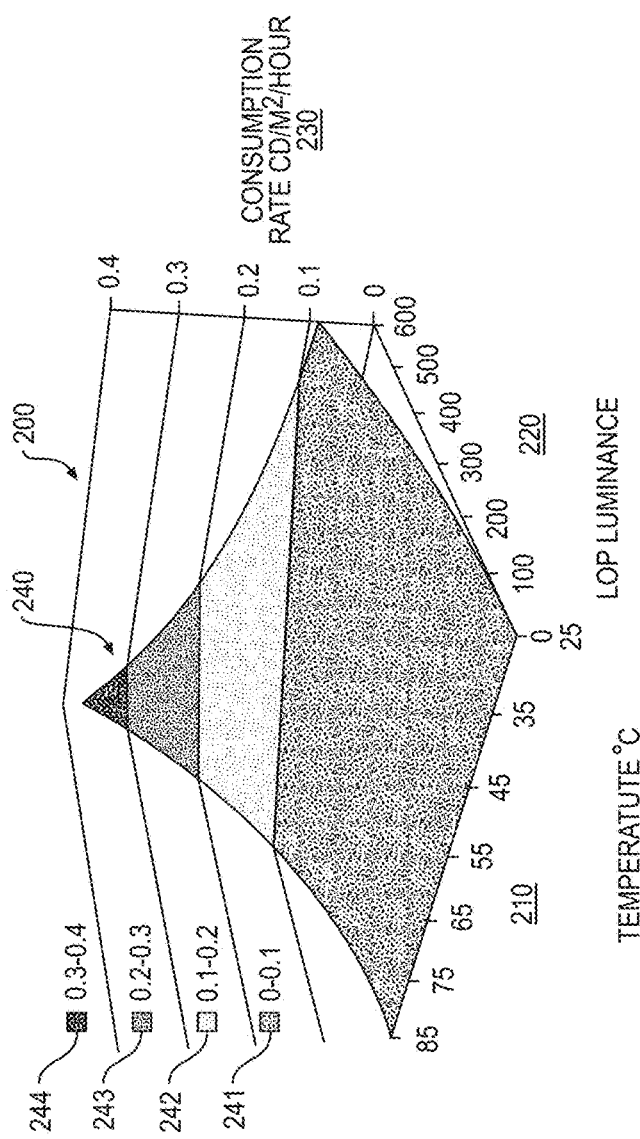
FIG. 2 is a graph plotting the relationship of luminance and temperature variances versus the consumption rate (CR)

FIG. 2 illustrates a graph 200 of FORMULA 1. Graph 200 includes three axis, a temperature axis 210 (in Celsius), a $L_{op}$ 220 (in Luminance), and a CR axis 230 (in candelas (cd)/meter(m)²/Hour). As shown, the various CR limits are calculated per luminance and temperature, and plotted in a three-dimensional graph.

The plotted value 240 shows a three-dimensional graph of the calculated CR values/limits when the x-axis 220 and y-axis is varied. The various inputs (i.e. the two axis shown), generate a different range of CR limits, as shown by values on the z-axis 230. The ranges shown are respectively 241-244.

The calculated CR illustrates the benefit of operating an emissive display 14 at a lower $L_{op}$. $CR_1$ and $CR_2$, using FORMULA 1, are examples of consumption rates for two test cases respectively. The two test cases are:

1. Operating at a level of 600 cd/m2 at 45° C. (318° K).
2. Operating at a level of 300 cd/m2 at 35° C. (308° K).
   Note that the lower temperature is estimated due to the lower operating luminance compared to the 600 cd/m2 case 1.

$$CR_1 = \frac{600^2}{300} \frac{0.1}{(6.42 \times 10^{10}) \times 318^{\circ -3} - 1075.5}$$

$$CR_1 = 0.13 \frac{\text{nits}}{\text{hour}}$$

$$CR_2 = \frac{300^2}{300} \frac{0.1}{(6.42 \times 10^{10}) \times 308^{\circ -3} - 1075.5}$$

$$CR_2 = 0.0267 \frac{\text{nits}}{\text{hour}}$$

Thus, using the experimentally derived FORMULA 1, the CR an OLED experiences when being provided a lower luminance operating condition may drastically decreases. The examples/graph 200 shown above illustrates the important experimentally derived interplay between temperature, luminance level, and an experimentally derived CR.

Based on the above, an operator of an emissive display 14 can implement a control circuit 12 with an input to enter in a predefined CR limit 23. Thus, the implementer of system 10 may provide a specific CR limit 23, and with that, derive a drive signal 20 to drive an emissive display 14 (see FORMULA 2).

Figure 3:
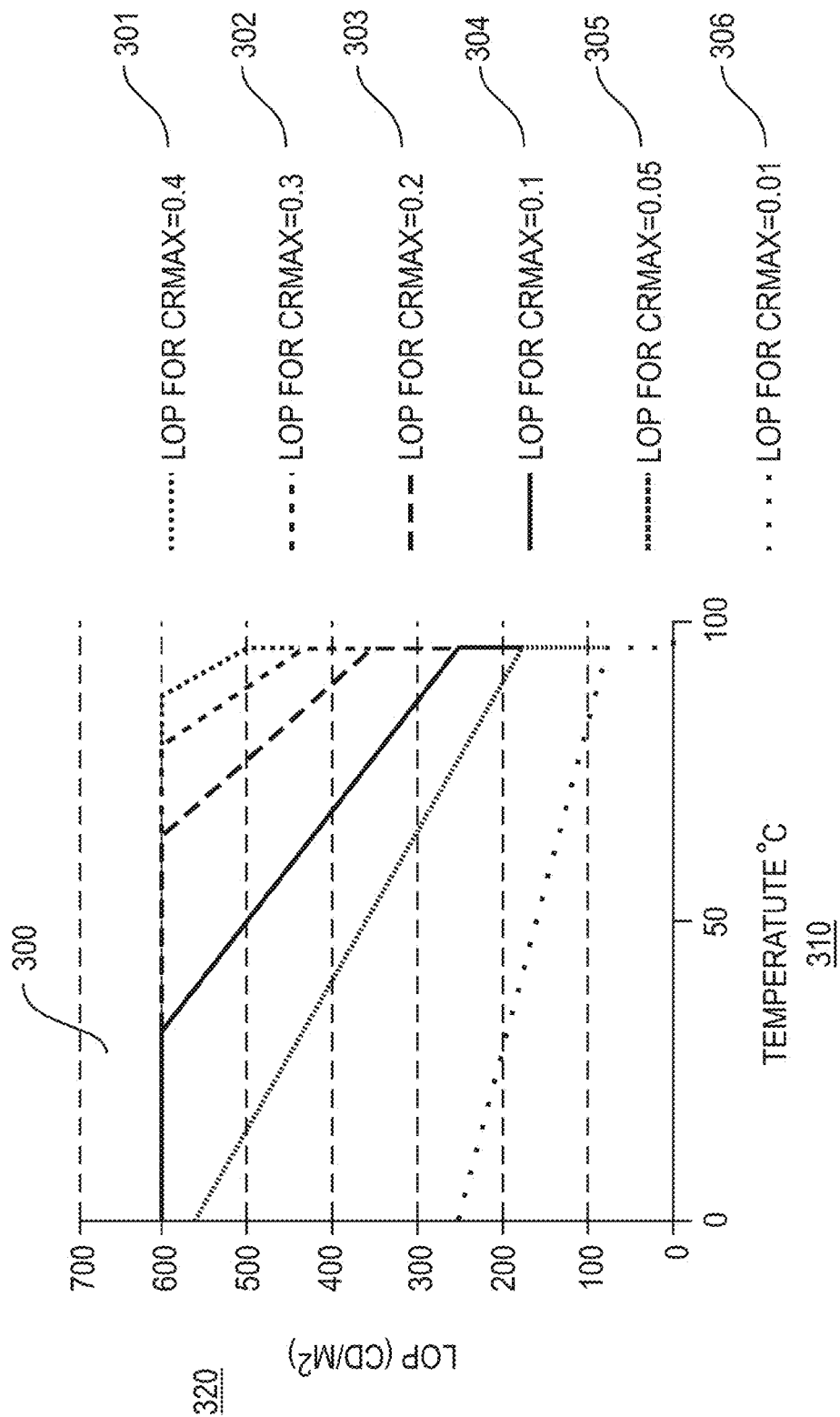
FIG. 3 is a graph plotting the relationship between luminance and temperature when constrained by a CR limit.

FIG. 3 illustrates a graph 300 for relating a $L_{op}$ 310 with a measured temperature 320. The various values 301-306 are shown plotted on graph 300. Thus, for a desired consumption rate (which may be set by the implementer of system 10, or by methods explained below), the plotted $L_{op}$ should be used to drive the emissive display 14.

The following relationship is derived from FORMULA 1, and solved for $L_{op}$:

$$L_{op} = \sqrt{\frac{CR \times L_{max} \lfloor 6.42 \times 10^{10} \times {}^\circ K^{-3} - 1075.5 \rfloor}{0.1}} \qquad \text{FORMULA 2}$$

The importance of knowing or setting a CR limit is exemplified by a vehicle situation. When a driver/passenger enters into a vehicle, the internal temperature may be hot due to solar or other conditions (known as a "hot start condition"). If the CR limit is set based on a desire to protect an OLED from degradation, and the temperature is known—the luminance may be altered to adhere to the CR limit shown in graph 300. Thus, as the air conditioning turns on, and the vehicle's cabin lowers, the luminance may increase and provide the user with a brighter display.

Figure 4:
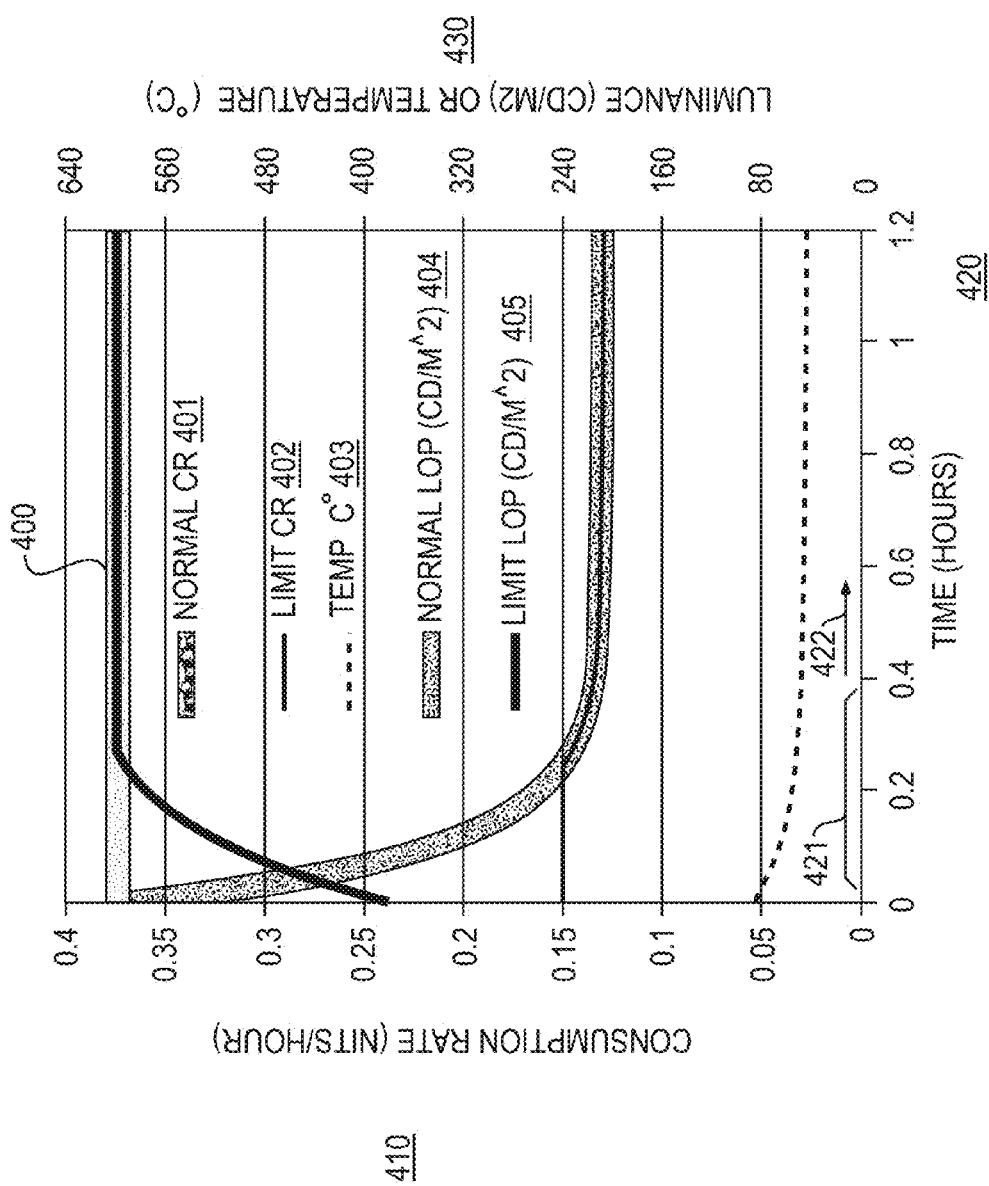
FIG. 4 is a graph illustrating differences between using the system of FIG. 1 versus not using the system of FIG. 1.

FIG. 4 illustrates a graph 400 explaining the implementation of the CR limit based on the hot start situation described above. On the left side of the y-axis 410, the CR is shown, as a function of time, and specifically with plotted values 401 and 402. Value 401 represents the generated CR (normal CR) without limiting the CR. Value 402 represents a condition in which the CR is limited to 0.15 as a maximum (as shown in the graph, as the temperature 403 decreases, the value 402 reduces based on the relationship shown in FORMULA 2).

The x-axis 420 is the time (in hours). Also shown is time period 421 and time period 422. In time period 421, the temperature 403 is initially at a higher value (approximately 85 degrees), while the temperature 403 settles to an equilibrium at time period 422.

Values 404 and 405 represent the luminance value in the cases where the CR limit is not used and is used, respectively. Essentially, the luminance value is controlled to be lower based on a CR limit value 402 being implemented. As shown, because the luminance is lower for at least the period 421, the CR is heavily decreased (as shown by the value difference between 401 and 402).

Assuming in the example above, with a drop in temperature of about 85 degrees to 45 degrees, the comparison between when luminance is not CR limited, and when it is can be calculated by the following relationship:

$$CR = \frac{L_{op}^2}{L_{max}} [1.08 \times 10^{-4} + 2.01 \times 10^{-4} \times e^{-t/0.1}] \frac{\text{nits}}{\text{hour}} \qquad \text{FORMULA 3}$$

FORMULA 3 may be integrated to calculate a specific luminance degradation (LD):

$$LD = \int_0^t CR\,dt \quad \text{FORMULA 4}$$

$$LD = \frac{L_{op}^2}{L_{max}}[1.08E^{-4}t + 2.01E^{-5}(1-e^{-t/0.1})] \text{ nits}$$

Thus, using the sample values in graph 400, the case where CR is not limited produces the following amount of delta LD:

$$\Delta LD = \frac{L_{op}^2}{L_{max}}[2.01E^{-5}(1-e^{-\infty/0.1})]$$

$$\Delta LD = \frac{600^2}{300}2.01E^{-5} = 0.02412 \frac{\text{nits}}{\text{start}}$$

And the case where CR is limited produces the following amount of delta LD:

$$\Delta LD = (0.15 - 0.1296)0.247 + 0.02412e^{-0.247/0.1}$$

$$\Delta LD = 0.00704 \frac{\text{nits}}{\text{start}}$$

where start is the amount of nits (a unit of luminance) used per the start period.

As shown, by implementing an experimentally found CR limit, the reduction in nits per a start period is drastic (0.00704 versus 0.024). By limiting the luminance to an experimentally calculated CR limit, an OLED life may be improved and the degradation may be avoided.

Various techniques may be employed to utilize a CR limit—with each of the techniques being implemented in a control system provided along with an OLED display:
- a lookup table to determine the operating luminance as a function of measured OLED temperature;
- a relation between the operating luminance as a function measured OLED temperature; and
- a proportional, integral, derivative (PID) control loop to control the operating luminance as a function of the measured OLED temperature.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:

1. A system to compensate for luminance degradation of a display, the system comprising:
   a luminance control system coupled to the display and configured to provide power to the display thereby controlling the display luminance, the luminance control system including an input to receive a consumption rate (CR) limit;
   a temperature sensor proximate the display and in electrical communication with a controller,
   wherein the luminance control system is configured to vary the display luminance, based on a temperature measured by the temperature sensor and the CR limit.

2. The system according to claim 1, wherein the display luminance is determined by a relationship between the consumption rate, maximum luminance of the display, and temperature of the display.

3. The system according to claim 1, wherein the display luminance is maximized so as to be under CR limit by employing the following relationship:

$$L_{OP} = f(CR, K°)$$

wherein:
$L_{op}$ is the display luminance; and
° K is a temperature in Kelvin of the display.

4. The system according to claim 1, wherein the temperature sensor is a thermistor.

5. The system according to claim 1, wherein the luminance control system retrieves a luminance based on correlating the measured temperature with a value in a predefined lookup table.

6. The system according to claim 2, wherein the luminance control system is implemented with a circuit to perform the relationship.

7. The system according to claim 1, wherein the luminance control system employs a PID control loop.

8. A display integrated with a luminance control system, comprising:
   a consumption rate (CR) limit;
   a temperature sensor proximate the display and in electrical communication with a controller,
   wherein:
   the luminance control system coupled to the display and configured to provide power to the display thereby controlling the display luminance, and
   the luminance control system is configured to vary the display luminance, based on a temperature measured by the temperature sensor and the CR limit.

9. The display according to claim 8, wherein the display luminance is determined by a relationship between the consumption rate, maximum luminance of the display, and temperature of the display.

10. The display according to claim 8, wherein the display luminance is maximized so as to be under CR limit by employing the following relationship:

$$L_{OP} = f(CR, K°)$$

wherein:
$L_{op}$ is the display luminance; and
° K is a temperature in Kelvin of the display.

11. The display according to claim 8, wherein the temperature sensor is a thermistor.

12. The display according to claim 8, wherein the luminance control system retrieves a luminance based on correlating the measured temperature with a value in a predefined lookup table.

13. The display according to claim 8, wherein the luminance control system is implemented with a circuit to perform the relationship.

14. The display according to claim 8, wherein the luminance control system employs a PID control loop.

15. The system according to claim 1, the control system retrieves a luminance based on correlating the measured temperature with a value in a predefined lookup table.

* * * * *